United States Patent [19]

Kanamori et al.

[11] 4,346,176

[45] Aug. 24, 1982

[54] GLASS FOR OPTICAL FIBER

[75] Inventors: Terutoshi Kanamori; Toyotaka Manabe, both of Mito, Japan

[73] Assignee: Nippon Telegraph & Telephone Public Corp., Tokyo, Japan

[21] Appl. No.: 225,094

[22] Filed: Jan. 14, 1981

[30] Foreign Application Priority Data

Feb. 13, 1980 [JP] Japan ................................. 55/15417

[51] Int. Cl.$^3$ .......................... C03C 3/12; C03C 13/00
[52] U.S. Cl. ........................................ 501/37; 501/40; 501/904
[58] Field of Search ..................... 106/47 R, 47 Q, 50; 501/37, 40, 904

[56] References Cited

U.S. PATENT DOCUMENTS

| | | | |
|---|---|---|---|
| 2,466,509 | 4/1949 | Sun ..................................... | 106/47 R |
| 4,120,814 | 10/1978 | Izumitani et al. ................. | 501/44 X |
| 4,142,986 | 3/1979 | Rapp .............................. | 106/47 Q X |
| 4,308,066 | 12/1981 | Mitachi et al. ........................ | 501/37 |

FOREIGN PATENT DOCUMENTS 2227236 11/1974 France ............................. 106/47 Q

OTHER PUBLICATIONS

Sun, K. H., "Fluoride Glasses", Glass Technology, 20 (1), Feb. 1979, pp. 36-40.
Chem. Abstracts-90 (1979), p. 569, item 212565w, Videau, J. J. et al., "Elaboration and Optical Properties of New Neodymium-Activated Fluoride Glasses".
"Sur de nouveaux verres aluminofluorés", revue de Chimie Minerale, vol. 16, No. 4, 1979, Jean-Jacques Videau et Josik Portier.

*Primary Examiner*—Helen M. McCarthy
*Attorney, Agent, or Firm*—Frishauf, Holtz, Goodman & Woodward

[57] ABSTRACT

Glass for an optical fiber consists essentially of 10 to 64 mol % of at least one kind of fluoride selected from a first group consisting of $CaF_2$, $SrF_2$ and $BaF_2$; 0.5 to 50 mol % of at least one kind of fluoride selected from a second group consisting of $YF_3$ and fluorides of lanthanide elements; and 30 to 65 mol % of $AlF_3$.

13 Claims, No Drawings

GLASS FOR OPTICAL FIBER

The present invention relates to glass for optical fibers which have a transmitting window in the infrared region and, more particularly, to glass for optical fibers which do not contain an oxide component but does contain an $AlF_3$ component. Conventionally, quartz glass ($SiO_2$) has been used as glass for optical fibers. However, with glass of this kind, infrared ray absorption due to oscillation of Si-O bonds is present. Due to this and Rayleigh scattering, the wavelength range which has only a small transmission loss is limited to the visible and near infrared region within the range of 0.6 to 1.7 μm wavelength. Therefore, this type of glass has been unsuitable as glass for optical fibers for use within the infrared region of long wavelength for attaining low transmission loss.

As a material which is only required to transmit light in the infrared region, halide glass of a halogen compound is known. Examples of this include $BeF_2$ glass, $ZnCl_2$ glass, $ZrF_4$-$ThF_4$-$BaF_2$ glass or the like. Although this type of glass is capable of transmitting light of longer wavelength than that transmitted by $SiO_2$ glass, secular degradation due to humidity, that is, the infrared absorption due to the O—H bonds of the water, is increased since $BeF_2$ and $ZnCl_2$ are deliquescent. Further, $BeF_2$ and $ThF_4$ are disadvantageously noxious to health because the former is strongly toxic and the latter is radio-active.

Another prior art glass for optical fiber is an oxide glass containing a fluoride such as $AlF_3$. Such glass is disclosed in U.S. Pat. No. 4,120,814, for example. The prior art glass consists essentially of ½ $P_2O_5$, $AlF_3$, $YF_3$, $(Ba+Sr+Ca+Mg)F_2$, ½ $Nd_2O_3$ and $(Na+Li+K)F$, and provides a stable product of high quality as glass which does not contain crystals. However, since this glass contains an oxide among its components, it exhibits infrared absorption as in the case of quartz glass. This glass has thus been unsuitable as glass for optical fibers which are required to have good transmittance in the infrared region of over 2 μm wavelength.

It is, therefore, the primary object of the present invention to provide glass for optical fibers which does not contain any oxide component but which contains other fluoride components as well as $AlF_3$, which has good transmittance with a low transmission loss in the infrared region, and which is nontoxic.

In order to accomplish the above and other objects, the present invention provides glass for an optical fiber, which consists essentially of 10 to 64 mol % of at least one kind of fluoride selected from a first group of $CaF_2$, $SrF_2$ and $BaF_2$; 0.5 to 50 mol % of at least one kind of fluoride selected from a second group of $YF_3$ and fluorides of lanthanide elements; and 30 to 65 mol % of $AlF_3$. Thus, the optical fiber glass according to the present invention contains $AlF_3$ and fluorides such as $CaF_2$, $SrF_2$, $BaF_2$, $YF_3$, and fluorides of lanthanide elements, none of which are deliquescent or toxic, and do not contain oxide components. Due to this, the glass for optical fiber of the present invention has good transmittance even in the infrared region of over 2 μm wavelength and has high stability against crystallization. The glass for optical fibers of the present invention is further advantageous in that the final product may be produced less expensively, since $AlF_3$ is used as a raw material.

The present invention will now be described by way of its examples.

In Examples 1 to 6, the glasses for optical fibers are made of materials of ternary system each having different composition ratios. The three components of each material are $CaF_2$ selected from the first group of $CaF_2$, $SrF_2$ and $BaF_2$; $YF_3$ the second group of $YF_3$ and fluorides of lathanide elements; and $AlF_3$.

In Example 1, 1.5 g of a mixture of powder consisting 59.5 mol % of $CaF_2$, 0.5 mol % of $YF_3$ and 40 mol % of $AlF_3$, was put in a platinum crucible of 35 mm inner diameter and was melted at 950° C. in an argon gas atmosphere. The molten material was cooled to 890° C. in the heating furnace and thereafter cooled by dipping the bottom of the crucible in water. A transparent material of about 0.6 mm thickness, that is, a glass for an optical fiber, was obtained.

It was learned from Example 1 that the lower limit of the content of $YF_3$ selected from the second group is 0.5 mol %.

In Example 2, five mixtures of powder each consisting of $CaF_2$, $YF_3$ and $AlF_3$ in a different composition ratio as shown in Table 1 below were used in an amount of 3.0 g.

TABLE 1

| No. | 1. | 2. | 3. | 4. | 5. | |
|---|---|---|---|---|---|---|
| $CaF_2$ | 55 | 50 | 40 | 30 | 20 | (mol %) |
| $YF_3$ | 5 | 10 | 20 | 30 | 40 | (mol %) |
| $AlF_3$ | 40 | 40 | 40 | 40 | 40 | (mol %) |

Each mixture of the respective composition ratio was put in a platinum crucible of 35 mm inner diameter and was melted at 1,000° C. in an argon gas atmosphere. The five molten materials were cooled to 950° C. in the heating furnace and were then cooled by dipping the bottom of the crucibles in water. Transparent glass plates about 1.2 mm thick were obtained.

In Example 3, 1.0 g of a mixture of powder having a composition ratio of 10 mol % of $CaF_2$, 50 mol % of $YF_3$, and 40 mol % of $AlF_3$ was put in a platinum crucible of 35 mm inner diameter and was melted at 1,000° C. in an argon atmosphere. The molten material was cooled to 930° C. in the heating furnace and then cooled by dipping the bottom of the crucible in water. A transparent glass of about 0.4 mm thickness was obtained.

It was learned from Examples 2 and 3 that the upper limit of the content of $YF_3$ selected from the second group is 50 mol %. It was further learned from Example 3 that the lower limit of the content of $CaF_2$ selected from the first group is 10 mol %.

In Example 4, four mixtures of powder each consisting of $CaF_2$, $YF_3$ and $AlF_3$ in a different composition ratio as shown in Table 2 below were used in an amount of 1 g.

TABLE 2

| No. | 1. | 2. | 3. | 4. | |
|---|---|---|---|---|---|
| $CaF_2$ | 64 | 62 | 60 | 58 | (mol %) |
| $YF_3$ | 1 | 1 | 1 | 1 | (mol %) |
| $AlF_3$ | 35 | 37 | 39 | 41 | (mol %) |

Each mixture of the respective composition was put in a platinum crucible of 35 mm inner diameter and was melted at 1,000° C. in an argon gas atmosphere. The molten materials were cooled to 880° C. in the heating furnace and were then cooled by dipping the bottom of the crucibles in water. Transparent glass plates about 0.4 mm thick were obtained.

It was learned from Example 4 that the upper limit of the content of $CaF_2$ selected from the first group is 64 mol %. It was also shown that the lower limit of the content of $AlF_3$ in the ternary system was 35 mol %.

In Example 5, three mixtures of powder each consisting of $CaF_2$, $YF_3$ and $AlF_3$ in a different composition ratio as shown in Table 3 below were used in an amount of 1.5 g.

TABLE 3

| No. | 1. | 2. | 3. |
|---|---|---|---|
| $CaF_2$ | 55 | 45 | 35 (mol %) |
| $YF_3$ | 10 | 20 | 30 (mol %) |
| $AlF_3$ | 35 | 35 | 35 (mol %) |

Each mixture of the respective composition was put in a platinum crucible of 35 mm inner diameter and was melted at 1,000° C. in an argon gas atmosphere. The molten materials were cooled to 900° C. in the heating furnace and were then cooled by dipping the bottom of the crucibles in water. Transparent glass plates of about 0.6 mm thick were obtained.

It was learned from Example 5 that the lower limit of the content of $AlF_3$ in the ternary system is 35 mol %.

In Example 6, two mixtures of powder each consisting of $CaF_2$, $YF_3$ and $AlF_3$ in a different composition ratio as shown in Table 4 below were used.

TABLE 4

| No. | 1. | 2. |
|---|---|---|
| $CaF_2$ | 40 | 30 (mol %) |
| $YF_3$ | 10 | 10 (mol %) |
| $AlF_3$ | 50 | 60 (mol %) |

Each mixture of the respective composition was put in a platinum crucible of 35 mm inner diameter and was melted at 1,000° C. in an argon gas atmosphere. The molten materials were cooled to 900° C. in the heating furnace and were then cooled by dipping the bottom of the crucibles in water. Transparent glass plates about 0.6 mm thickness were obtained.

It was learned from Example 6 that the upper limit of the content of $AlF_3$ in the ternary system was 60 mol %.

In Example 7, three mixtures of powder of a quaternary system were used. Each powder consisted in an amount of 1.5 g had a different composition ratio of $CaF_2$ and $BaF_2$ selected from the first group; $YF_3$ selected from the second group; and $AlF_3$. The composition ratios of these powder are shown in Table 5 below.

TABLE 5

| No. | 1. | 2. | 3. |
|---|---|---|---|
| $CaF_2$ | 25 | 20 | 13 (mol %) |
| $BaF_2$ | 25 | 20 | 12 (mol %) |
| $YF_3$ | 20 | 15 | 10 (mol %) |
| $AlF_3$ | 30 | 45 | 65 (mol %) |

Each mixture of the respective composition was put in a platinum crucible of 35 mm inner diameter and was melted at 1,000° C. in an argon gas atmosphere. The molten materials were cooled to 850° C. in the heating furnace and were then cooled by dipping the bottom of the crucibles in water. Transparent glass plates about 0.6 mm thick were obtained.

It was learned from Example 7 that the lower limit of the content of $AlF_3$ was 30 mol %, and its upper limit was 65 mol %.

In Example 8, two mixtures of powder of a quaternary system were used in an amount of 3.0 g. Each powder consisted of $CaF_2$ and $SrF_2$ selected from the first group; $YF_3$ selected from the second group; and $AlF_3$. The composition ratios of these powders are reported in Table 6 below.

TABLE 6

| No. | 1. | 2. |
|---|---|---|
| $CaF_2$ | 30 | 20 (mol %) |
| $SrF_2$ | 20 | 30 (mol %) |
| $YF_3$ | 10 | 10 (mol %) |
| $AlF_3$ | 40 | 40 (mol %) |

Each mixture of the respective composition was put in a platinum crucible of 35 mm inner diameter and was melted at 1,000° C. in an argon gas atmosphere. The molten materials were cooled to 900° C. in the heating furnace and were then cooled by dipping the bottom of the crucibles in water. Transparent glass plates about 1.2 mm thick were obtained.

In Example 9, glasses for optical fibers were obtained from two mixtures of powder of a ternary system of different composition ratios, each powder consisting of $SrF_2$ selected from the first group; $YF_3$ selected from the second group; and $AlF_3$. The composition ratios of the powders are shown in Table 7 below.

TABLE 7

| No. | 1. | 2. |
|---|---|---|
| $SrF_2$ | 50 | 30 (mol %) |
| $YF_3$ | 10 | 30 (mol %) |
| $AlF_3$ | 40 | 40 (mol %) |

Each mixture of the respective composition was put in a platinum crucible of 35 mm inner diameter and was melted at 1,000° C. in an argon gas atmosphere. The molten materials were cooled to 950° C. in the heating furnace and were then cooled by dipping the bottom of the crucibles in water. Transparent glass plates about 0.6 mm thick were obtained.

In Example 10, glass for an optical fiber was obtained from a material of ternary system consisting of $BaF_2$ selected from the first group, $YF_3$ selected from the second group, and $AlF_3$. In this example, 1.5 g of a mixture of powder having the composition ratio of 30 mol % of $BaF_2$, 10 mol % of $YF_3$, and 60 mol % of $AlF_3$ was put in a platinum crucible of 35 mm inner diameter and was melted at 950° C. in an argon gas atmosphere. The molten material was cooled to 950° C. in the heating furnace and was then cooled by dipping the bottom of the crucible in water. A transparent glass plate about 0.5 mm thick was obtained.

In Example 11, 2 g of a mixture of powder of the quaternary system consisting of $SrF_2$ and $BaF_2$ selected from the first group, $YF_3$ selected from the second group, and $AlF_3$ was used. The composition ratio was 40 mol % of $SrF_2$, 10 mol % of $BaF_2$, 10 mol % of $YF_3$, and 40 mol % of $AlF_3$. The mixture of the above composition ratio was put in a platinum crucible of 35 mm inner diameter and was melted at 1,000° C. in an argon gas atmosphere. The molten material was cooled to 950° C. in the heating furnace and was then cooled by dipping the bottom of the crucible in water. A transparent glass plate about 0.7 mm thick was obtained.

In Example 12, 2 g of a mixture of powder of the quinary system of $CaF_2$, $SrF_2$ and $BaF_2$ selected from the first group, $YF_3$ selected from the second group, and AlF$_3$ was used. The composition ratio was 20 mol % of CaF$_2$, 20 mol % of SrF$_2$, 10 mol % of BaF$_2$, 10 mol % of YF$_3$, and 40 mol % of AlF$_3$. The mixture of the above composition ratio was put in a platinum crucible of 35 mm inner diameter and was melted at 1,000° C. in an argon gas atmosphere. The molten material was cooled to 900° C. in the heating furnace and was then cooled by dipping the bottom of the crucible in water. A transparent glass plate about 0.7 mm thick was obtained.

In Example 13, three mixtures of powder of a ternary system were used in an amount of 2.5 g. The first component was CaF$_2$ selected from the first group; the third was AlF$_3$; and the second was respectively, LaF$_3$, GdF$_3$ and LuF$_4$ of the fluorides of lanthanide elements selected from the second group. The composition ratios of the powders are shown in Table 8 below.

TABLE 8

| No. 1. | | 2. | | 3. | |
|---|---|---|---|---|---|
| CaF$_2$ | 50 (mol %) | CaF$_2$ | 50 (mol %) | CaF$_2$ | 50 (mol %) |
| LaF$_3$ | 10 (mol %) | GdF$_3$ | 10 (mol %) | LuF$_3$ | 10 (mol %) |
| AlF$_3$ | 40 (mol %) | AlF$_3$ | 40 (mol %) | AlF$_3$ | 40 (mol %) |

Each mixture of the respective composition was put in a platinum crucible of 35 mm inner diameter and was melted at 1,000° C. in an argon gas atmosphere. These molten materials were cooled to 930° C. in the heating furnace and were then cooled by dipping the bottom of the crucibles in water. Transparent glass plates about 1 mm thick were obtained.

In Example 14, two mixtures of powder of a ternary system were used in an amount of 2.0 g. The components where SrF$_2$ selected from the first group; AlF$_3$; and GdF$_3$ and LuF$_3$, respectively, among the fluorides of lanthanide elements selected from the second group. The composition ratios of the powders are shown in Table 9 below.

TABLE 9

| No. 1. | | 2. | |
|---|---|---|---|
| SrF$_2$ | 50 (mol %) | SrF$_2$ | 50 (mol %) |
| GdF$_3$ | 10 (mol %) | LuF$_3$ | 10 (mol %) |
| AlF$_3$ | 40 (mol %) | AlF$_3$ | 40 (mol %) |

Each mixture of the respective composition was put in a platinum crucible of 35 mm inner diameter and was melted at 1,000° C. in an argon gas atmosphere. These molten materials were cooled to 920° C. in the heating furnace and were then cooled by dipping the bottom of the crucibles in water. Transparent glass plates about 0.7 mm thick were obtained.

In Example 15, 2 g of a mixture of powder of an octonary system was used. The composition ratio being 20 mol % of CaF$_2$, 10 mol % of SrF$_2$ and 10 mol % of BaF$_2$, all selected from the first group; 9 mol % of YF$_3$, and 4 mol % of LaF$_3$, 4 mol % of GdF$_3$, and 3 mol % of LuF$_3$ among the lanthanide elements, all being selected from the second group: and 40 mol % of AlF$_3$. The mixed powder of the octonary system was put in a platinum pot of 35 mm inner diameter and was melted at 1,000° C. in an argon gas atmosphere. The molten material was cooled to 900° C. in the heating furnace and was then cooled by dipping the bottom of the crucible in water. A transparent glass plate about 0.7 mm thick was obtained.

In Example 16, 2 g of a mixture of powder of a quinary system was used. The composition ratio being 40 mol % of CaF$_2$ selected from the first group; 5 mol % of CeF$_3$ and 5 mol % of NdF$_3$ among the fluorides of the lanthanide elements, and 10 mol % of YF$_3$, all being selected from the second group; and 40 mol % of AlF$_3$.

The mixture was put in a platinum crucible of 35 mm inner diameter and was melted at 1,000° C. in an argon gas atmosphere. The molten material was cooled to 920° C. in the heating furnace and was then cooled by dipping the bottom of the crucible in water. A transparent glass plate about 0.8 mm thick was obtained.

The upper and lower limits, in mol %, of the respective components of the composition ratios suitable for glasses for optical fibers were confirmed from Examples 1 to 16, though all possible particular mol percentages between the upper and lower limits are not described. Among Examples 1 to 16, the mixed powder of composition No. 2 in Table 5 of Example 7 is the best mode of carrying out the present invention. According to this composition, the material consists of 20 mol % of CaF$_2$ and 20 mol % of BaF$_2$ selected from the first group; 15 mol % of YF$_3$ selected from the second group; and 45 mol % of AlF$_3$.

What we claim is:

1. Fluoride glass for an optical fiber having good transmittance with a low transmission loss in the infrared region consisting essentially of 10 to 64 mol % of at least one fluoride selected from a first group consisting of CaF$_2$, SrF$_2$ and BaF$_2$; 0.5 to 50 mol% of at least one fluoride selected from a second group consisting of YF$_3$ and the fluorides of the lanthanide elements; and 30 to 65 mol % of AlF$_3$.

2. Glass for an optical fiber according to claim 1 wherein CaF$_2$ selected from the first group is used in an amount of 10 mol % of 64 mol %; YF$_3$ selected from the second group is used in an amount of 0.5 mol % to 50 mol %; and AlF$_3$ is used in an amount of 35 mol % to 60 mol %.

3. Glass for an optical fiber according to claim 1 wherein CaF$_2$ and BaF$_2$ selected from the first group are used in amounts of 25 mol % of 13 mol % and 25 mol % to 12 mol %, respectively; YF$_3$ selected from the second group is used in an amount of 20 mol % to 10 mol %; and AlF$_3$ is used in an amount of 30 mol % to 65 mol %.

4. Glass for an optical fiber according to claim 1 wherein CaF$_2$ and SrF$_2$ selected from the first group are used in amounts of 30 mol % to 20 mol % and 20 mol % to 30 mol %, respectively; YF$_3$ selected from the second group is used in an amount of 10 mol %; and AlF$_3$ is used in an amount of 40 mol %.

5. Glass for an optical fiber according to claim 1 wherein SrF$_2$ selected from the first group is used in an amount of 50 mol % to 30 mol %; YF$_3$ selected from the second group is used in an amount of 10 mol % to 30 mol %; and AlF$_3$ is used in an amount of 40 mol %.

6. Glass for an optical fiber according to claim 1 wherein BaF$_2$ selected from the first group is used in an amount of 30 mol %; YF$_3$ selected from the second group is used in an amount of 10 mol %; and AlF$_3$ is used in an amount of 60 mol %.

7. Glass for an optical fiber according to claim 1 wherein SrF$_2$ and BaF$_2$ selected from the first group are used in amounts of 40 mol % and 10 mol %, respectively; YF$_3$ selected from the second group is used in an amount of 10 mol %; and AlF$_3$ is used in an amount of 40 mol %.

8. Glass for an optical fiber according to claim 1 wherein CaF$_2$, SrF$_2$ and BaF$_2$ selected from the first group are used in amounts of 20, 20 and 10 mol %, respectively; $YF_3$ selected from the second group is used in an amount of 10 mol %; and $AlF_3$ is used in an amount of 40 mol %.

9. Glass for an optical fiber according to claim 1 wherein $CaF_2$ selected from the first group is used in an amount of 50 mol %; one compound selected from the group consisting of $LaF_3$, $GdF_3$ and $LuF_3$ of the second group is used in an amount of 10 mol %; and $AlF_3$ is used in an amount of 40 mol %.

10. Glass for an optical fiber according to claim 1 wherein $SrF_2$ selected from the first group is used in an amount of 50 mol %; one compound selected from the group consisting of $GdF_3$ and $LuF_3$ of the second group is used in an amount of 10 mol %; and $AlF_3$ is used in an amount of 40 mol %.

11. Glass for an optical fiber according to claim 1 wherein $CaF_2$, $SrF_2$ and $BaF_2$ selected from the first group are used in amounts of 20, 10 and 10 mol %, respectively $YF_3$, $LaF_3$, $GdF_3$ and $LuF_3$ selected from the second group are used in amounts of 9, 4, 4 and 3 mol % respectively; and $AlF_3$ is used in an amount of 40 mol %.

12. Glass for an optical fiber according to claim 1 wherein $CaF_2$ selected from the first group is used in an amount of 40 mol %; $YF_3$, $CeF_3$ and $NdF_3$ selected from the second group are used in amounts of 10, 5 and 5 mol %, respectively; and $AlF_3$ is used in an amount of 40 mol %.

13. Glass for an optical fiber according to claim 1 consisting essentially of 20 mol % $CaF_2$, 20 mol % $BaF_2$, 15 mol %, $YF_3$, and 45 mol % $AlF_3$.

* * * * *